(12) United States Patent
Gschwind et al.

(10) Patent No.: US 10,310,854 B2
(45) Date of Patent: Jun. 4, 2019

(54) NON-FAULTING COMPUTE INSTRUCTIONS

(71) Applicant: INTERNATIONAL BUSINESS MACHINES CORPORATION, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 14/755,543

(22) Filed: Jun. 30, 2015

(65) Prior Publication Data

US 2017/0004088 A1    Jan. 5, 2017

(51) Int. Cl.
*G06F 9/30* (2018.01)
*G06F 12/0875* (2016.01)

(52) U.S. Cl.
CPC ........ *G06F 9/30007* (2013.01); *G06F 9/3004* (2013.01); *G06F 9/30145* (2013.01); *G06F 12/0875* (2013.01); *G06F 2212/452* (2013.01)

(58) Field of Classification Search
CPC . G06F 9/30007; G06F 9/3004; G06F 9/30145
See application file for complete search history.

(56) References Cited

U.S. PATENT DOCUMENTS 5,781,750 A * 7/1998 Blomgren ........... G06F 9/30145
                                                703/26
5,903,739 A    5/1999 Dice
(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Benjamin P Geib
*Assistant Examiner* — Andrew J Cromer
(74) *Attorney, Agent, or Firm* — Steven Chiu, Esq.; Blanche E. Schiller, Esq.; Heslin Rothenberg Farley & Mesiti P.C.

(57) ABSTRACT

A compute instruction to be executed is to use a memory operand in a computation. An address associated with the memory operand is to be used to locate a portion of memory from which data is to be obtained and placed in the memory operand. A determination is made as to whether the portion of memory extends across a specified memory boundary. Based on the portion of memory extending across the specified memory boundary, the portion of memory includes a plurality of memory units and a check is made as to whether at least one specified memory unit is accessible and whether at least one specified memory unit is inaccessible. Based on the checking indicating the at least one specified memory unit is accessible and the at least one specified memory unit is inaccessible accessing the at least one specified memory unit that is accessible and placing data from the at least one specified memory unit that is accessible in one or more locations in the memory operand, and for the at least one unit of memory that is inaccessible, placing default data in one or more other locations of the memory operand.

18 Claims, 10 Drawing Sheets

(56) References Cited

U.S. PATENT DOCUMENTS

| | | | | |
|---|---|---|---|---|
| 5,974,538 | A * | 10/1999 | Wilmot, II | G06F 9/30069 712/217 |
| 7,707,464 | B2 | 4/2010 | Gilgen | |
| 8,738,860 | B1 | 5/2014 | Griffin et al. | |
| 9,286,076 | B2 * | 3/2016 | Belmar | G06F 9/30087 |
| 9,569,127 | B2 * | 2/2017 | Gschwind | G06F 3/0622 |
| 9,690,509 | B2 * | 6/2017 | Gschwind | G06F 3/0622 |
| 9,703,721 | B2 * | 7/2017 | Gschwind | G06F 12/1009 |
| 2006/0092165 | A1 | 5/2006 | Abdalla | |
| 2006/0149892 | A1 | 7/2006 | McFarling | |
| 2007/0294496 | A1 | 12/2007 | Goss | |
| 2010/0095075 | A1 | 4/2010 | Ganesh | |
| 2011/0004739 | A1 | 1/2011 | Hohmuth | |
| 2011/0016291 | A1 | 1/2011 | Kuo et al. | |
| 2011/0060887 | A1 | 3/2011 | Thatcher | |
| 2011/0314263 | A1 | 12/2011 | Greiner et al. | |
| 2012/0317441 | A1 * | 12/2012 | Gonion | G06F 8/4441 714/15 |
| 2013/0159662 | A1 | 6/2013 | Iyigun | |
| 2013/0246738 | A1 | 9/2013 | Bradbury et al. | |
| 2013/0339672 | A1 | 12/2013 | Jacobi et al. | |
| 2015/0033038 | A1 | 1/2015 | Goss et al. | |
| 2015/0035840 | A1 | 2/2015 | Koker | |
| 2015/0089146 | A1 | 3/2015 | Gotwalt | |
| 2015/0173253 | A1 | 6/2015 | Lewis, II et al. | |
| 2016/0188242 | A1 * | 6/2016 | Gschwind | G06F 3/0622 711/163 |
| 2016/0188483 | A1 * | 6/2016 | Gschwind | G06F 12/1009 711/206 |
| 2016/0188485 | A1 | 6/2016 | Gschwind et al. | |
| 2016/0188496 | A1 | 6/2016 | Gschwind et al. | |
| 2017/0003913 | A1 * | 1/2017 | Gschwind | G06F 3/0659 |
| 2017/0003914 | A1 * | 1/2017 | Gschwind | G06F 3/0659 |
| 2017/0003961 | A1 | 1/2017 | Gschwind et al. | |

OTHER PUBLICATIONS

"Power ISA™ Version 2.07B," International Business Machines Corporation, Apr. 9 2015, pp. 1-1526.

"z/Architecture — Principles of Operation," IBM® Publication No. SA22-7832-10, Eleventh Edition, Mar. 2015, pp. 1-1732.

U.S. Appl. No. 14/583,974, filed Dec. 29, 2014, "Processing Page Fault Exceptions in Supervisory Software When Accessing Strings and Similar Data Structures Using Normal Load Instructions," pp. 1-59.

U.S. Appl. No. 14/583,970, filed Dec. 29, 2014, "Computer Instructions for Limiting Access Violation Reporting When Accessing Strings and Similar Data Structures," pp. 1-59.

Anonymous, "Method for Enabling Misaligned Packed Data Type Instructions Load Operand Instructions," IP.com No. 000109202, Mar. 2005, pp. 1-3.

Liou, Koujuch, "Design of Pipelined Memory Systems for Decoupled Architectures," IP.com No. 000161117, Dec. 2007, pp. 1-267.

Relson, et al., IBM z/Enterprise EC12 CPU Facilities, Aug. 2013, pp. 1-62.

Office Action for U.S. Appl. No. 14/755,420 dated Jul. 19, 2016, pp. 1-17.

Final Office Action for U.S. Appl. No. 14/755,420 dated Jan. 26, 2017, pp. 1-18.

Office Action for U.S. Appl. No. 14/941,572 dated Apr. 25, 2017, pp. 1-18.

Office Action for U.S. Appl. No. 14/755,420 dated May 8, 2017, pp. 1-16.

List of IBM Patents or Patent Applications Treated as Related, Jul. 19, 2017, 2 pages.

Final Office Action for U.S. Appl. No. 14/941,572 dated Aug. 29, 2017, pp. 1-17.

Final Office Action for U.S. Appl. No. 14/755,420 dated Aug. 30, 2017, pp. 1-17.

* cited by examiner

NON-FAULTING COMPUTE INSTRUCTIONS

BACKGROUND

One or more aspects relate, in general, to processing within a computing environment, and in particular, to processing of compute instructions within the computing environment.

Compute instructions, such as arithmetic or logic instructions, may perform an arithmetic or logic operation on a plurality of operands, and those operands may be specified in registers, referred to as register operands, or read from memory, referred to as memory operands. To be read from memory, access is to be permitted to the memory locations being read.

In particular, memory may be organized into pages (or other sizes of memory units), and each page includes a range of addresses specifying a plurality of memory locations. The addresses may be virtual addresses, if the environment includes virtual memory, and thus, address translation may be needed. Address translation is used in order to convert a virtual memory address to a physical or real memory address. The translation from a virtual memory address to a physical or real memory address is stored in an entry within a data structure, such as a page table entry. Additionally, the memory locations in a single page of memory typically share a common set of access permissions. Access permissions determine whether an application has privileges to read or write the contents of a memory page.

A portion of memory (e.g., a plurality of memory locations) to be accessed to populate a memory operand may be located anywhere within a memory page, including for example, near the end of a page, spanning a boundary that separates two or more different pages, or extending up to the end of a page without crossing the page boundary. An application attempting to access a portion of memory that spans a page boundary is to have a page table entry (i.e., an address translation, if needed) and access permissions for both pages. If the application has access to the first page but not the second page, a page fault violation occurs when the application attempts to access the second page or perform address translation for the second page. In order to protect system integrity, operating systems are typically strict in not allowing applications to access a page without having the proper access permissions. Thus, operating systems typically prematurely end the offending application in response to a page fault violation.

SUMMARY

Based on the foregoing, a need exists for a capability that does not necessarily cause premature ending of an application based on a page fault violation when a page (or other size memory unit) is inaccessible. A need exists for a capability to improve performance of a computing environment by limiting the premature ending of applications.

Shortcomings of the prior art are overcome and additional advantages are provided through the provision of a computer program product for facilitating processing of compute instructions in a computing environment. The computer program product includes a storage medium readable by a processing circuit and storing instructions for execution by the processing circuit for performing a method. The method includes, for instance, obtaining, by a processor, a compute instruction to be executed, the compute instruction to use a memory operand in a computation indicated by the compute instruction; obtaining an address associated with the memory operand, the address to be used to locate a portion of memory from which data is to be obtained and placed in the memory operand; determining whether the portion of memory extends across a specified memory boundary, wherein based on the portion of memory extending across the specified memory boundary, the portion of memory comprises a plurality of memory units; based on determining the portion of memory extends across the specified memory boundary, checking whether at least one specified memory unit of the plurality of memory units is accessible and whether at least one specified memory unit of the plurality of memory units is inaccessible; and based on the checking indicating the at least one specified memory unit is accessible and the at least one specified memory unit is inaccessible, accessing the at least one specified memory unit that is accessible and placing data from the at least one specified memory unit that is accessible in one or more locations in the memory operand, and for the at least one unit of memory that is inaccessible, placing default data in one or more other locations of the memory operand, wherein based on placing the data and the default data in the memory operand, the memory operand is to be used in the computation.

Advantageously this enables processing to continue while speculatively leveraging high-bandwidth memory accesses even if a memory unit is inaccessible, thereby, improving performance.

In one embodiment, the at least one specified memory unit that is inaccessible is positioned in memory after the at least one memory unit that is accessible. In a further embodiment, the checking checks whether a first memory unit is accessible, and the accessing is performed based on at least the first memory unit being accessible.

In another aspect, the computation is emulated, and the emulating uses the memory operand. As one example, control is provided to a control component, and the computation is emulated by the control component, the emulating using the memory operand.

As a further embodiment, the memory operand is stored in a designated location, the designated location to be accessed to perform the computation. In yet a further aspect, the compute instruction is restarted, the memory operand is obtained from the designated location, and the computation is performed using the memory operand from the designated location. Advantageously, by using the designated location, performance is improved by not requiring the memory operand to be re-populated.

In one aspect, a determination is made as to whether the compute instruction is a non-faulting compute instruction, and wherein the checking is performed based on the determining indicating the instruction is a non-faulting compute instruction. As examples, the determining whether the compute instruction comprises a non-faulting compute instruction comprises checking one of: an encoding of the compute instruction, an encoding of the memory operand, an operating mode of the processor, or a prefix of the compute instruction.

In one implementation, the default data to be placed in the one or more other locations is configurable. This advantageously allows configuration of values for default data targeting a specific application's requirements (e.g., return a sequence of 0 byte characters for null terminated string processing, return a sequence of single precision Quiet Not-a-Numbers for single precision floating point applications, etc.).

In another aspect, a computer system for facilitating processing of compute instructions in a computing environment is provided. The computer system includes, for instance, a memory; and a processor in communications with the memory, wherein the computer system is configured to perform a method. The method includes, for instance, obtaining, by the processor, a compute instruction to be executed, the compute instruction to use a memory operand in a computation indicated by the compute instruction; obtaining an address associated with the memory operand, the address to be used to locate a portion of memory from which data is to be obtained and placed in the memory operand; determining whether the portion of memory extends across a specified memory boundary, wherein based on the portion of memory extending across the specified memory boundary, the portion of memory comprises a plurality of memory units; based on determining the portion of memory extends across the specified memory boundary, checking whether at least one specified memory unit of the plurality of memory units is accessible and whether at least one specified memory unit of the plurality of memory units is inaccessible; and based on the checking indicating the at least one specified memory unit is accessible and the at least one specified memory unit is inaccessible, accessing the at least one specified memory unit that is accessible and placing data from the at least one specified memory unit that is accessible in one or more locations in the memory operand, and for the at least one unit of memory that is inaccessible, placing default data in one or more other locations of the memory operand, wherein based on placing the data and the default data in the memory operand, the memory operand is to be used in the computation.

In yet a further aspect, a computer-implemented method of facilitating processing of compute instructions in a computing environment is provided. The computer-implemented method includes, for instance, obtaining, by a processor, a compute instruction to be executed, the compute instruction to use a memory operand in a computation indicated by the compute instruction; obtaining an address associated with the memory operand, the address to be used to locate a portion of memory from which data is to be obtained and placed in the memory operand; determining whether the portion of memory extends across a specified memory boundary, wherein based on the portion of memory extending across the specified memory boundary, the portion of memory comprises a plurality of memory units; based on determining the portion of memory extends across the specified memory boundary, checking whether at least one specified memory unit of the plurality of memory units is accessible and whether at least one specified memory unit of the plurality of memory units is inaccessible; and based on the checking indicating the at least one specified memory unit is accessible and the at least one specified memory unit is inaccessible, accessing the at least one specified memory unit that is accessible and placing data from the at least one specified memory unit that is accessible in one or more locations in the memory operand, and for the at least one unit of memory that is inaccessible, placing default data in one or more other locations of the memory operand, wherein based on placing the data and the default data in the memory operand, the memory operand is to be used in the computation.

Computer program products, methods and systems relating to one or more additional aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing, as well as features and advantages of one or more aspects, are apparent from the following detailed description taken in conjunction with the accompanying drawings in which:

DETAILED DESCRIPTION

In accordance with one or more aspects, a capability is provided to facilitate processing of compute instructions that use memory operands. In particular, processing is facilitated for compute instructions that use memory operands to be populated from a portion of memory that crosses at least one memory boundary (e.g., a page boundary). In one or more aspects, processing is facilitated for compute instructions that use memory operands populated from a portion of memory that crosses at least one memory boundary and for which at least one memory unit of the portion of memory is inaccessible. Performance is improved by preventing premature termination of an application issuing the instruction in such a situation, and instead, using default data for the inaccessible memory unit(s).

In one example, when a memory operand is employed in an instruction, a memory address (also referred to as a memory operand address) is determined, e.g., based on information in or otherwise associated with the instruction, and used to locate a portion of memory from which data is to be obtained and placed in the memory operand. At times, however, the portion of memory crosses one or more memory boundaries, such that multiple memory units (e.g., pages or other sizes of memory units) are to be accessed. If this occurs, a check is made as to whether the multiple memory units are accessible (e.g., whether the instruction or application issuing the instruction has permission to access each memory unit, and/or whether address translations for each memory unit are valid, etc.). If one or more of the memory units is inaccessible, then conventionally, the instruction and/or the application issuing the instruction fails. However, in accordance with one or more aspects, instead of failing the instruction or the application issuing the instruction, the data that would have been obtained from the one or more inaccessible memory units is replaced by one or more default values, and the compute operation is performed using the memory operand.

Figure 1:
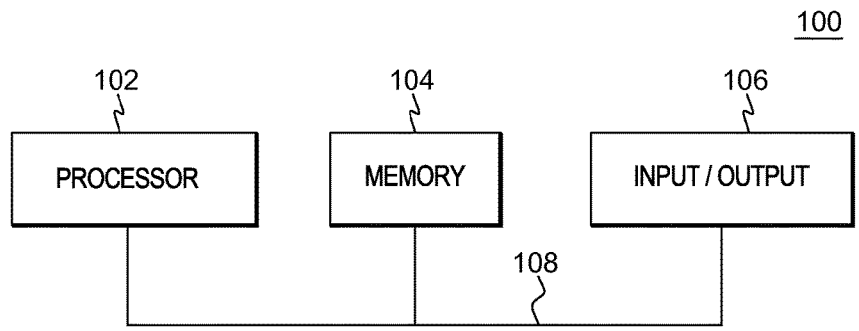
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures mentioned herein are merely provided as examples.

Figure 2A:
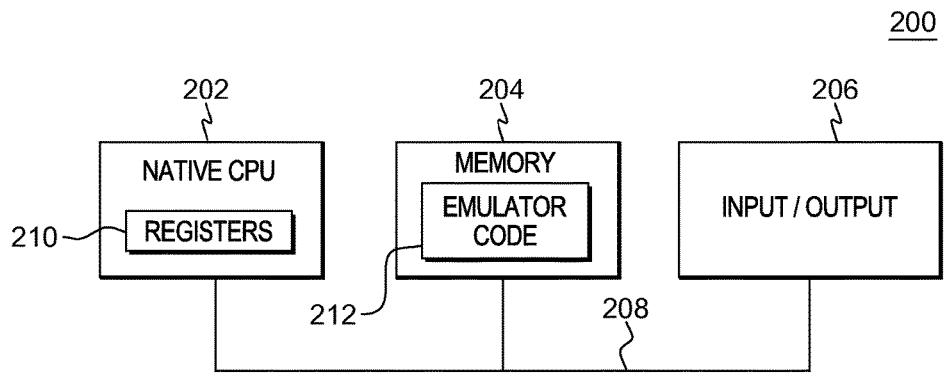
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
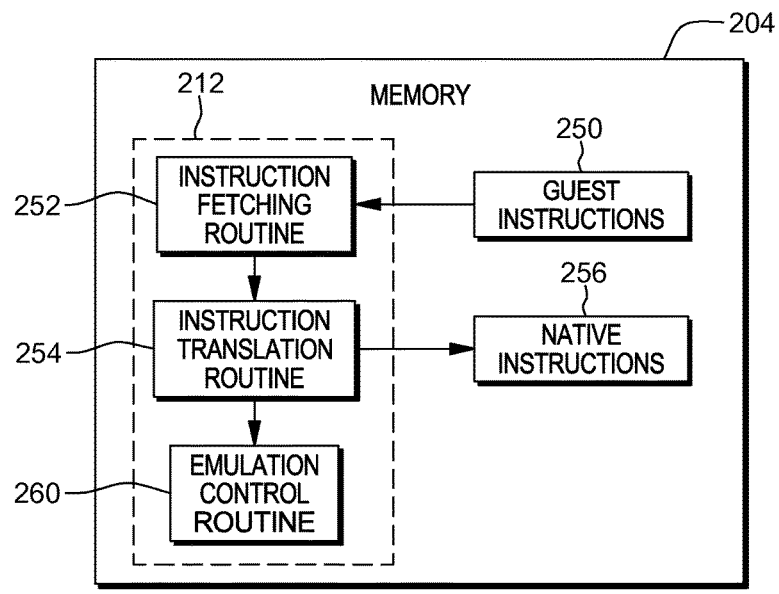
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture), is fetched from memory, translated and represented as a sequence of native instructions 256 of another architecture (e.g., the z/Architecture, Power architecture, Intel architecture, etc.). These native instructions are then executed.

As examples, the instructions to be executed according to one or more aspects of the present invention are compute instructions, such as those that perform arithmetic or logic computations. In one embodiment, the compute instructions may include vector compute instructions, which are part of a vector facility. The vector facility provides, for instance, fixed sized vectors ranging from one to sixteen elements. A vector, also referred to as a vector register, is a processor register (also referred to as a hardware register), which is a small amount of storage (e.g., not main memory) available as part of a central processing unit (CPU) or other processor. Each vector register has one or more elements, and an element is, for example, one, two, four or eight bytes in length. In other embodiments, elements can be of other sizes.

Figure 3:
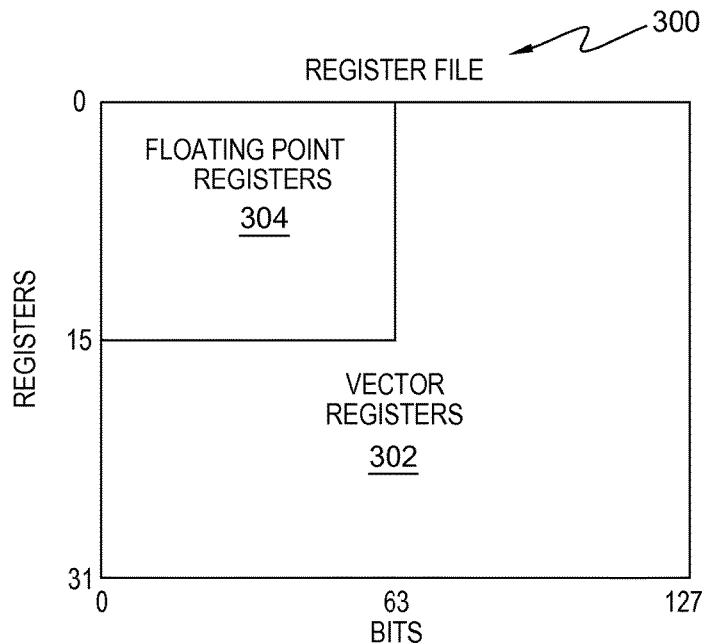
FIG. 3 depicts one example of a register file.

In one embodiment, there are 32 vector registers and other types of registers can map to a quadrant of the vector registers. For instance, as shown in FIG. 3, a register file 300 includes 32 vector registers 302 (registers 0-31) and each register is 128 bits in length (bits 0-127). Sixteen floating point registers 304, which are 64 bits in length, can overlay the vector registers. Thus, as an example, when floating point register 2 is modified, then vector register 2 is also modified. Other mappings for other types of registers are also possible.

Each vector includes data which is operated on by vector instructions defined in the facility. Vector instructions may be single instruction, multiple data (SIMD) instructions that perform vector operations, typically in parallel. In one embodiment, if a vector is made up of multiple elements, then each element is processed in parallel with the other elements. Instruction completion does not occur until processing of all the elements is complete. In other embodiments, the elements are processed partially in parallel and/or sequentially.

Vector instructions can be implemented as part of various architectures, including, but not limited to, the Power architecture, z/Architecture, x86, IA-32, IA-64, etc. Although embodiments described herein are for the Power architecture and z/Architecture, the vector instructions described herein and/or one or more other aspects may be based on many other architectures. The Power architecture and z/Architecture are only provided as examples.

Regardless of whether the compute instructions are vector instructions or other types of compute instructions, such as scalar compute instructions that perform processing serially, a compute instruction, in accordance with one or more aspects, includes at least one memory operand and may include one or more register operands on which a compute operation is to be performed.

Further, in accordance with one or more aspects of the present invention, the instructions described herein are referred to as non-faulting instructions, for convenience. A non-faulting instruction may be any instruction that does not fail based on a memory unit of a portion of memory to be used to populate a memory operand being inaccessible. Non-faulting indicates that in certain cases in which a memory boundary is crossed into inaccessible memory a fault that would end the instruction is not performed; instead, a partially inaccessible operand facility is invoked that provides default data, instead of memory data, for that portion of the memory operand. As examples, a memory unit is inaccessible when there is no valid address translation entry available for the memory unit; i.e., there is no valid real memory address for the memory unit, since the memory unit is, for instance, not backed by real memory; or there is no read access permission for the memory unit.

Figure 4:
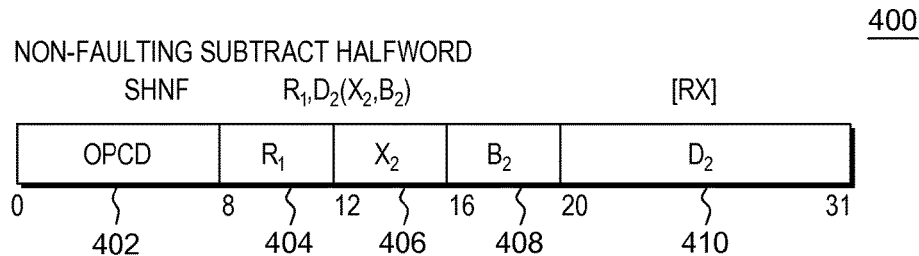
FIG. 4 depicts one example of a non-faulting compute instruction, in accordance with one or more aspects.

One example of a non-faulting instruction is a non-faulting subtract instruction, an example of which is described with reference to FIG. 4. A non-faulting subtract halfword instruction 400 includes, for instance, an opcode field (OPCD) 402 (e.g., bits 0-7) including an operation code to specify a non-faulting subtract halfword operation; a register field (Ri) 404 (e.g., bits 8-11) that indicates a register to be used by the instruction, the contents of which are a first operand; and fields $X_2$ 406 (e.g., bits 12-15), $B_2$ 408 (e.g., bits 16-19), and $D_2$ 410 (e.g., bits 20-31) used to provide a second operand. For instance, contents of the general registers designated by the $X_2$ and $B_2$ fields are added to the contents of the $D_2$ field to form a second operand address. In one example, this address is an address in memory, and the second operand is a memory operand. The memory operand is populated with data obtained from memory starting at the second operand address.

In operation of the non-faulting subtract instruction, the second operand is subtracted from the first operand, and the difference is placed at the first-operand location. In one example, the second operand is two bytes in length and is treated as a 16-bit signed binary integer; and the first operand and the difference are treated as 32-bit signed binary integers.

When there is an overflow, the result is obtained by allowing any carry into the sign-bit position and ignoring any carry out of the sign-bit position, and condition code 3 is set. If the fixed-point-overflow mask is one, a program interruption for fixed-point overflow occurs.

The displacement is treated as a 12-bit unsigned binary integer.

If a part of the memory used to populate the second operand lies in inaccessible storage, in accordance with an aspect of the present invention, a partially inaccessible operand facility (PIOF) is invoked, and a specified default value is returned for any part that resides in inaccessible storage.

Resulting Condition Code:

| | |
|---|---|
| 0 | Result zero; no overflow |
| 1 | Result less than zero; no overflow |
| 2 | Result greater than zero; no overflow |
| 3 | Overflow |

The non-faulting subtract halfword instruction is only one example of an instruction to incorporate and use one or more aspects of the present invention. Any instruction using a memory operand may be implemented as a non-faulting instruction. There are various options to indicate that an instruction is to be processed as a non-faulting instruction. These options include, but are not limited to, an indicator as part of the instruction encoding (e.g., as part of the opcode or other encoding of the instruction); an indicator as part of the memory operand encoding; an indicator as part of an operating mode of the machine; and an indicator as part of an instruction prefix. Other examples may also exist.

When an instruction is non-faulting, then if a portion of memory specified to be used to populate the memory operand spans one or more memory boundaries (e.g., it is unaligned) into inaccessible memory, then the instruction does not automatically fail, but instead, the memory operand is constructed from data obtained from accessible memory units and default values for the inaccessible memory units.

Figure 5:
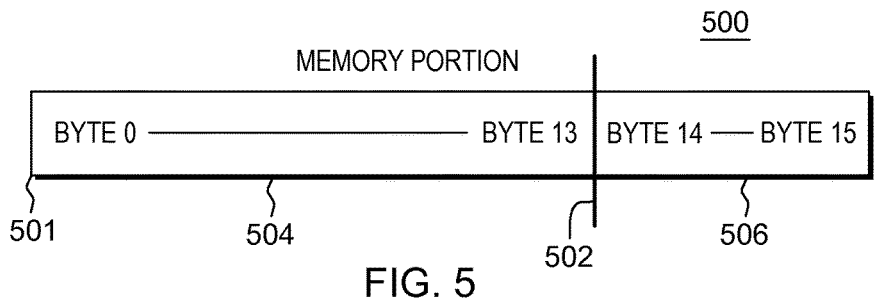
FIG. 5 depicts one example of a portion of memory spanning a memory boundary, in accordance with one or more aspects.

For instance, as shown in FIG. 5, a portion of memory 500 is depicted in which memory operand address 501 indicates a starting location in memory from which data is to be read and placed in the memory operand. Assume 16 bytes of data are to be read and further assume that a memory boundary 502 is reached prior to reading the 16 bytes of data. Since the memory boundary divides the memory portion into a first memory unit 504 (e.g., at least a portion of one page) and a second memory unit 506 (e.g., at least a portion of another page), there may be different access permissions associated therewith and each memory unit is to have its own valid address translation entry (i.e., a valid real memory address). Thus, a check is made for each memory unit of whether that memory unit is accessible (e.g., has a valid address translation entry with proper permissions).

Figure 6A:
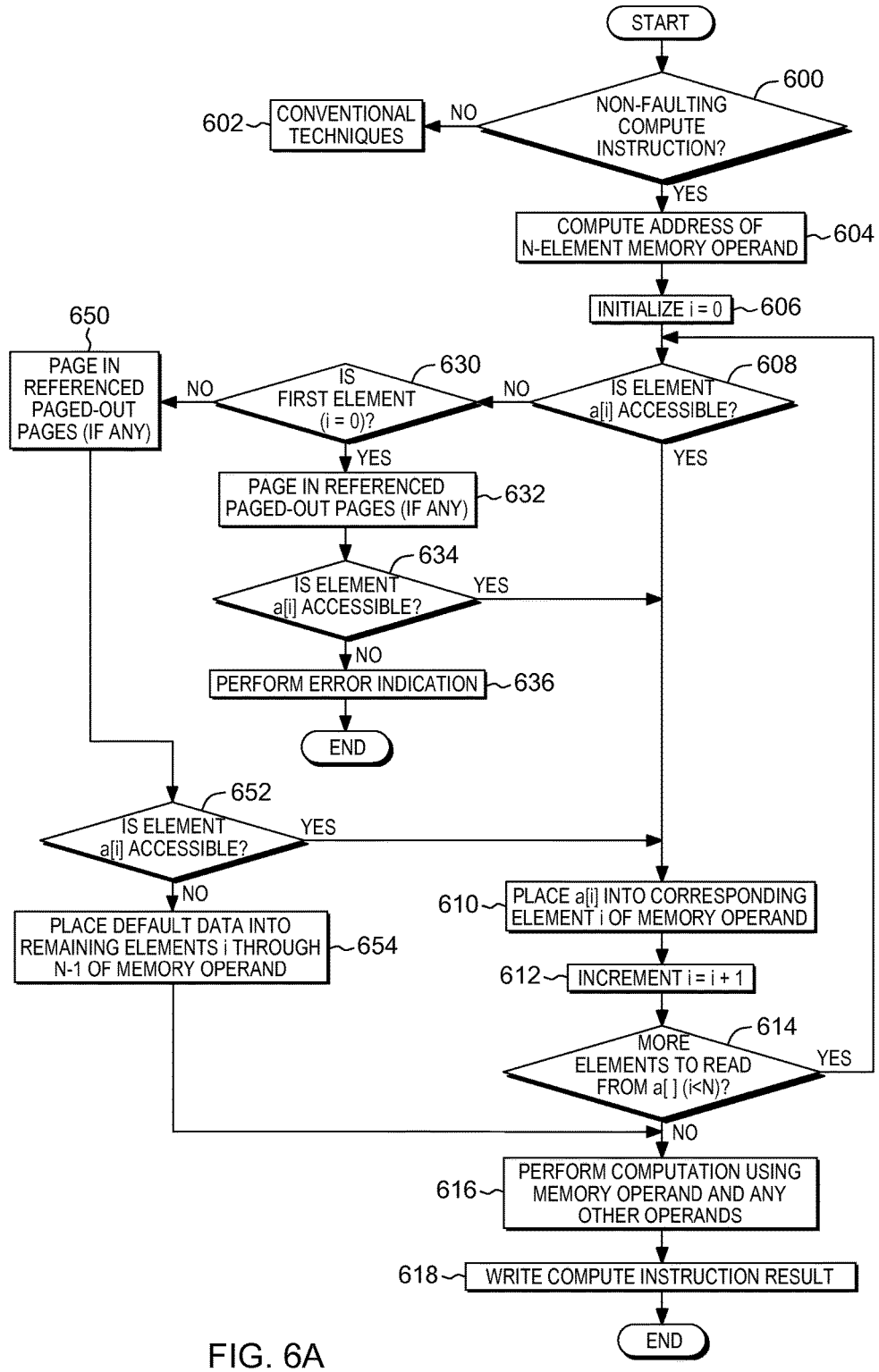
FIG. 6A depicts one embodiment of logic associated with executing a compute instruction, in accordance with one or more aspects.

One embodiment of logic associated with executing a non-faulting compute instruction is described with reference to FIG. 6A. Initially, a processor, e.g., hardware of the processor, obtains an instruction to be executed, and determines whether the instruction is a non-faulting compute instruction, INQUIRY 600. This is determined by, for instance, an indicator as described above. In one particular example, it is determined by the opcode of the obtained instruction. If the instruction is not a non-faulting compute instruction, then it is processed conventionally, STEP 602. However, if the instruction is a non-faulting compute instruction, such as non-faulting subtract instruction 400 or any other non-faulting compute instruction, the address of a memory operand is computed, STEP 604. For example, fields of the instruction (e.g., $X_2$, $B_2$, $D_2$) are used to determine the memory operand address. For instance, contents of the general registers designated by the $X_2$ and $B_2$ fields are added to the contents of the $D_2$ field to determine the address of the memory operand. In other examples, the address may be in a register specified in the instruction, an implied register of the instruction, a memory location, etc. In one example, the memory operand is an N-element operand, where N is 16 or another value.

Further, a variable, i, is initialized to zero, STEP 606, and a determination is made as to whether element a[i] is accessible in memory, INQUIRY 608. For instance, is element a[i] paged in (e.g., is there an address translation table entry (e.g., page table entry) for the memory unit (e.g., page) containing the element that is accessible by the hardware) and does the application have appropriate accesses, such as read access, to element a[i] in memory. In one example, read access is determined by checking the address translation table entry. For example, an indicator of the entry is checked to see if there is read access to the memory unit.

If the element is accessible, a[i] from memory is placed into the corresponding element i of the memory operand, STEP 610. Additionally, i is incremented by, e.g., one, STEP 612, and a determination is made as to whether more elements are to be read from memory, INQUIRY 614. If more elements are to be read (e.g., i<n), then processing continues to INQUIRY 608. Otherwise, the computation specified by the instruction (e.g., subtract) is performed using the memory operand and any other operands of the instruction (e.g., register operands), STEP 616. The result of the computation is provided, STEP 618. For instance, it is stored in a register or field specified by the instruction or otherwise associated with the instruction, as examples.

Returning to INQUIRY 608, if element a[i] is inaccessible (e.g., does not have a valid address translation entry accessible by hardware or does not have proper read permissions), then in one embodiment, a page fault is taken, a control component (e.g., operating system, interrupt handler, hypervisor, etc.) obtains control, and the partially inaccessible operand facility may be invoked. Initially, the control component determines if this is the first element of the memory operand being processed, INQUIRY 630. If it is the first element (e.g., i=0), then an attempt is made to page in any referenced paged-out pages, STEP 632. A determination is then made as to whether element a[i] is now accessible, INQUIRY 634. If it is accessible (e.g., has a valid address translation entry accessible by hardware with the proper permissions), processing continues to STEP 610. Otherwise, an error indication is provided, since in this example, default values are not to be provided if it is the first element that is inaccessible, STEP 636. That is, in one embodiment, at least a first memory unit (e.g., first page) is to be accessible to populate the memory operand. In this embodiment, only one or more subsequent memory units may be inaccessible. Otherwise, an error is indicated.

In another embodiment, the hardware may maintain control, instead of a page fault to the control component, if, e.g., the page table entry is available to the hardware, but the read permission is not valid.

Returning to INQUIRY 630, if it is not the first element, then an attempt is made to page in any referenced paged-out pages, STEP 650. A determination is then made as to whether element a[i] is now accessible, INQUIRY 652. If it is, processing continues to STEP 610. Otherwise, the element is inaccessible in that it does not have a valid address translation entry with proper permissions, and thus, default data (e.g., zeros or another value) is placed in the remaining elements i through N−1 of the memory operand, STEP 654. Thus, a memory operand is provided that includes data (e.g., bytes, halfwords, words, doublewords, etc.) corresponding to accessible memory and default data (e.g., bytes, halfwords, words, doublewords, etc.) for the inaccessible memory. Processing then continues at STEP 616.

The default data may be specified by the architecture or specified in a register, such as a control register. The control register may be set by an application, runtime system, a library, middleware, firmware, the operating system or hypervisor, etc. Further, in one aspect, the value to be used for the default data is configurable.

In one or more examples, the partially inaccessible operand facility (e.g., STEPS/INQUIRIES 630-636 and 650-654) may be implemented in hardware, software, emulated by the operating system, and/or a combination thereof. Many possibilities exist.

Further, in one embodiment, various memory units may be inaccessible, and thus, selected elements of the memory operand may include default data, not just the remaining elements. For instance, the portion of memory used to populate the memory operand may span two memory boundaries, providing first, second and third memory units. The first and third memory units may be accessible, while the second memory unit is not, and therefore, the memory operand is populated with data read from the first and third memory units, and default data for the second memory unit. This data is placed in the memory operand in respective locations. For instance, a first location in the memory operand corresponding to the first memory unit receives the data from the first memory unit; a second location in the memory operand corresponding to the second memory unit receives default data; and a third location in the memory operand corresponding to the third memory unit receives the data from the third memory unit. Many other examples and possibilities exist.

In one embodiment, when processing triggers the partially inaccessible operand facility (in particular, when default data is used), then the computation specified by the instruction may be emulated by a control component, such as the operating system, a hypervisor or other system component, using the memory operand provided by the partially inaccessible operand facility. This is further described with reference to FIG. 6B.

Figure 6B:
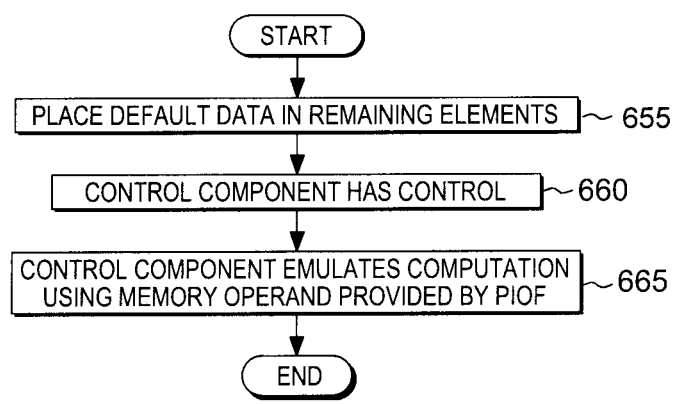
FIG. 6B depicts logic associated with a control component having control based on invoking the partially inaccessible operand facility, in accordance with one or more aspects.

Referring to FIG. 6B, in one embodiment, subsequent to placing the default data in the remaining elements i through N−1 (or specified elements), STEP 655, control is maintained by the control component, such as an operating system, hypervisor or other system component, assuming a page fault was taken previously, or is passed to the control component, STEP 660. Control is passed via, for instance, a page fault or an interrupt. The control component has control and emulates the computation (e.g., subtract) using the memory operand that was populated with the data from the accessible memory and the default data, STEP 665. For instance, the computation is translated into a sequence of instructions that represent the computation. One or more of those instructions uses the memory operand as constructed in accordance with PIOF, and those instructions are executed.

In a further embodiment, instead of the control component emulating the computation using the memory operand, subsequent to creating the memory operand, the instruction terminates and is restarted. One embodiment of this logic is described with reference to FIG. 7.

Figure 7:
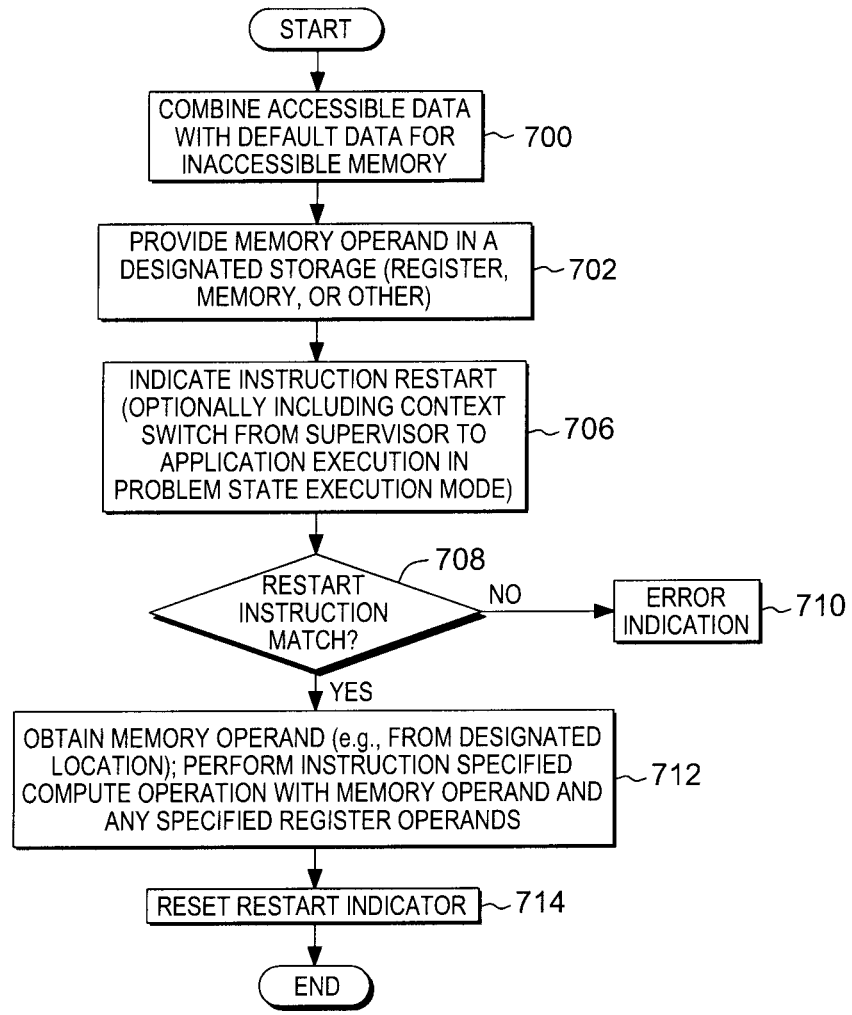
FIG. 7 depicts one example of logic associated with restarting a compute instruction, in accordance with one or more aspects.

Referring to FIG. 7, in this embodiment, subsequent to placing the default data in one or more elements of the memory operand, such that the accessible data is combined with the default data for the inaccessible memory, STEP 700, the memory operand just provided is stored in designated storage, such as a register, memory or other location, STEP 702.

An instruction restart is indicated by the processor, STEP 706. This optionally includes performing a context switch from supervisor execution to application execution in problem state execution mode. For instance, before restarting the instruction, if the emulation of assembling the memory operand from memory data and default data is performed in supervisor state, then a context switch to application state is performed prior to the instruction being restarted. However, if the emulation was performed by the operating system in application state, a context switch may not be needed.

Thereafter, optionally, a determination is made as to whether the appropriate instruction is being restarted, INQUIRY 708. This may include performing one or more checks including, for instance, a full instruction test match, checking instruction class, or checking whether the instruction includes a compatible memory operand, etc. If the check fails, assuming it is performed, an error is indicated, STEP 710. However, if the check is successful or if it is not performed, then the processor performs the compute operation with the memory operand stored in designated storage and any other operands, such as specified register operands, STEP 712. By using the designated storage, performance is improved by not having to re-populate the memory operand on restart.

Thereafter, a restart indicator, used for restarting the instruction, is reset, in one embodiment, STEP 714.

As described herein, in one embodiment, upon a restart, the hardware receives a value created by the partially inaccessible operand facility, e.g., using a microprocessor register specified by the architecture and/or microarchitecture, a control register, a special purpose register, or a designated memory location. In such an embodiment, when the operating system—or other supervisory software—restarts the instruction, a flag is set to obtain a memory operand value from, e.g., a register. In another embodiment, when multiple vector memory operands are possible, multiple such locations are provided. In another embodiment, only a single location is provided, and a restart further indicates which operand is to be substituted from the override location.

Another implementation of restarting the instruction after creating the memory operand is described with reference to FIG. 8. In one example, this is implemented as part of a return from the operating system or other control component.

Figure 8:
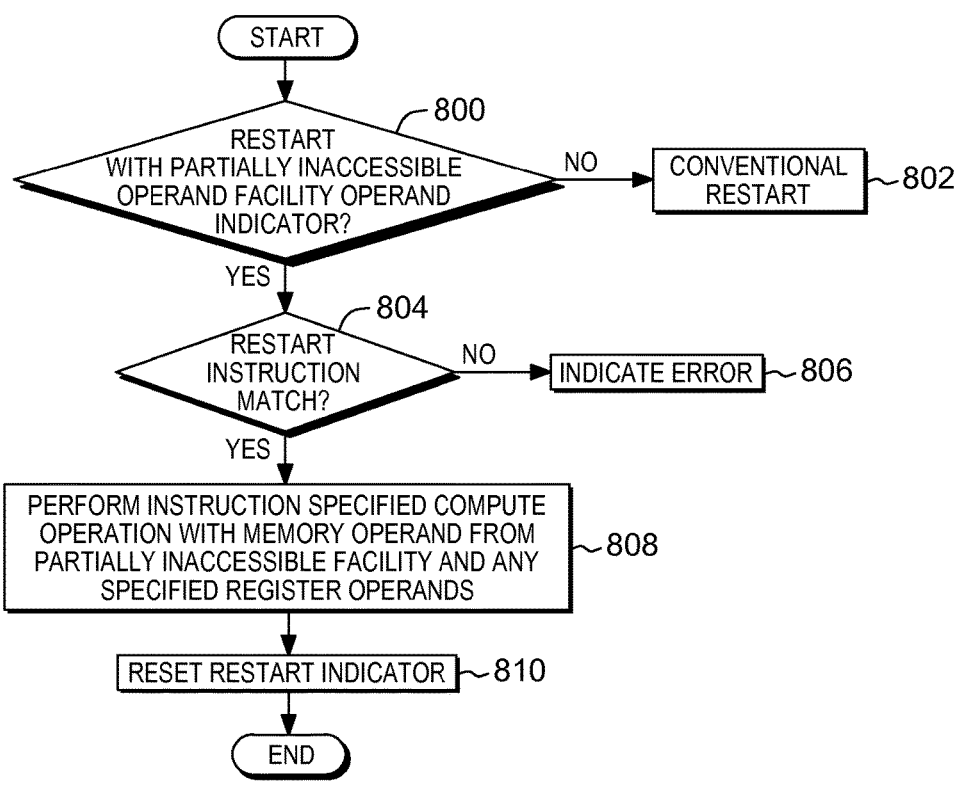
FIG. 8 depicts another example of logic associated with restarting a compute instruction, in accordance with one or more aspects.

Referring to FIG. 8, the processor determines whether the restart is with a partially inaccessible operand facility operand indicator being set, INQUIRY 800. If the indicator is not set, then it is a conventional restart, STEP 802. However, if the restart includes the set indicator, then optionally a check is made of the restarted instruction, STEP 804. If the instruction is checked and the check fails, an error is indicated, STEP 806. Otherwise, the processor performs the compute operation with the memory operand created using the partially inaccessible operand facility and any other operands specified or implied by the instruction, STEP 808.

Subsequently, the restart indicator is reset, STEP 810. This prevents subsequent instructions from overriding memory operands from the partially inaccessible operand facility.

As described herein, one or more aspects relate to speculatively prefetching data that spans a protection boundary into a region that does not permit read access. For instance, one or more aspects relate to memory read access operands used by, e.g., instructions, such as compute instructions, in which at least one operand is a memory operand. Particularly, one or more aspects provide memory read access operands when memory operands may be extending across a memory boundary (e.g., a page boundary) into inaccessible memory. In accordance with one or more aspects, compute instructions (including, but not limited to, vector compute instructions) receive an input operand. The input operand may be a memory operand that may be unaligned, and may extend from at least one first memory page (or other size of memory unit) into at least a second memory page (or other size of memory unit). When a memory operand is entirely located on a single page, the operand is accessed and processed by the instruction when the operand is accessible. However, when the operand is not accessible, a page fault is raised and the operating system kernel, as an example, receives control, e.g., to handle system functions, such as a page fault service. In one example, the partially inaccessible operand facility (PIOF) is invoked.

Figure 9:
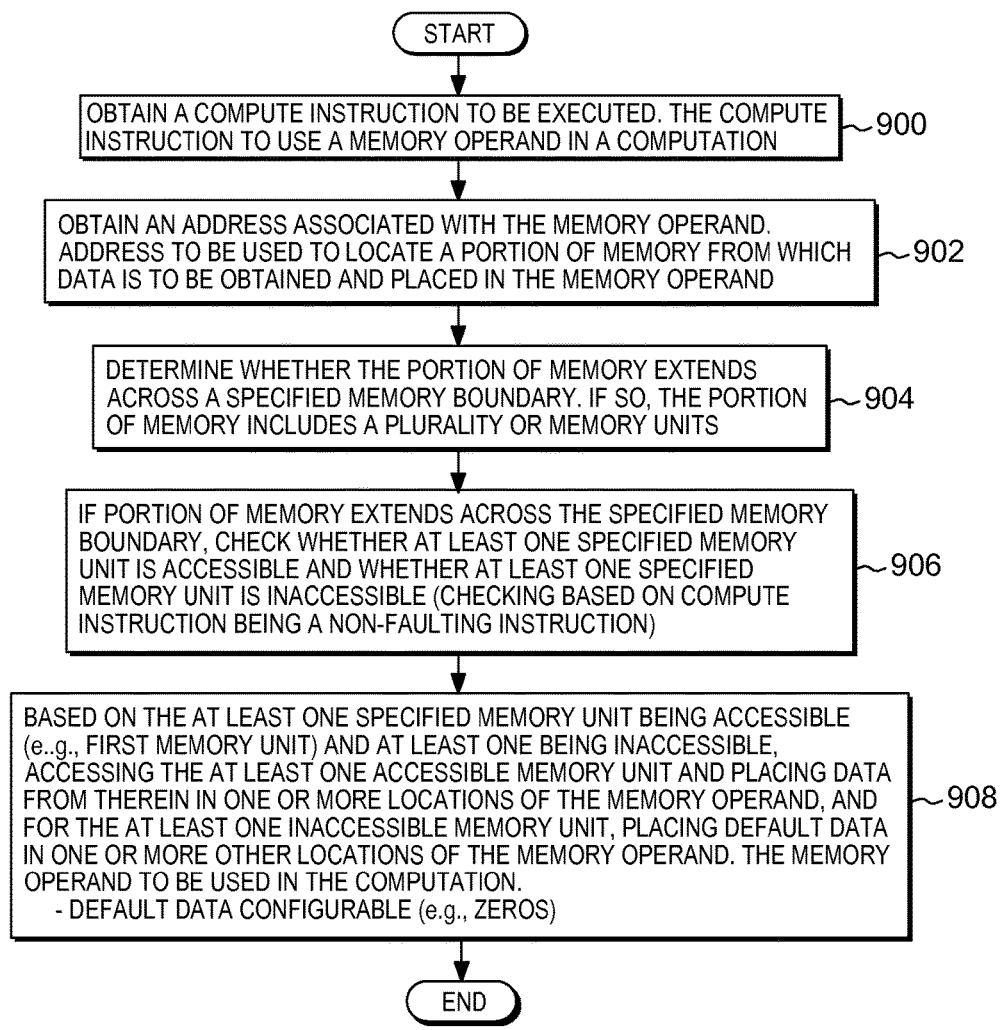
FIG. 9 depicts another embodiment of logic associated with processing a compute instruction, in accordance with one or more aspects.

As described herein, in one or more aspects and with reference to FIG. 9, a processor obtains a compute instruction to be executed. The compute instruction is to use a memory operand in a computation indicated by the compute instruction, STEP 900. An address associated with the memory operand is obtained, and the address is to be used to locate a portion of memory for which data is to be obtained and placed in the memory operand, STEP 902. A determination is made as to whether the portion of memory extends across a specified memory boundary, STEP 904. Based on the portion of memory extending across the specified memory boundary, the portion of memory includes a plurality of memory units. Based on determining the portion of memory extends across the specified memory boundary, a check is made as to whether at least one specified memory unit of the plurality of memory units is accessible and whether at least one specified memory unit of the plurality of memory units is inaccessible, STEP 906. Based on the checking indicating the at least one specified memory unit is accessible and the at least one specified memory unit is inaccessible, the at least one specified memory unit that is accessible is accessed and data from that at least one specified memory unit that is accessible is placed in the memory operand at one or more locations, STEP 908. Further, for the at least one specified memory unit that is inaccessible, default data is placed in one or more other locations of the memory operand. Based on placing the data and the default data in the memory operand, the memory operand is to be used in computation.

Advantageously, this enables processing to continue without prematurely terminating the instruction and/or application, thus improving performance.

In one embodiment, the checking checks whether a first memory unit is accessible and the accessing is performed based on at least the first memory unit being accessible.

Although page and page boundary are referred to herein, one or more aspects relate to other sizes of memory units; page is only one example of a size of a memory unit. Further, as used herein, storage, central storage, main storage, memory and main memory are used interchangeably, unless otherwise noted, implicitly by usage or explicitly.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 10:
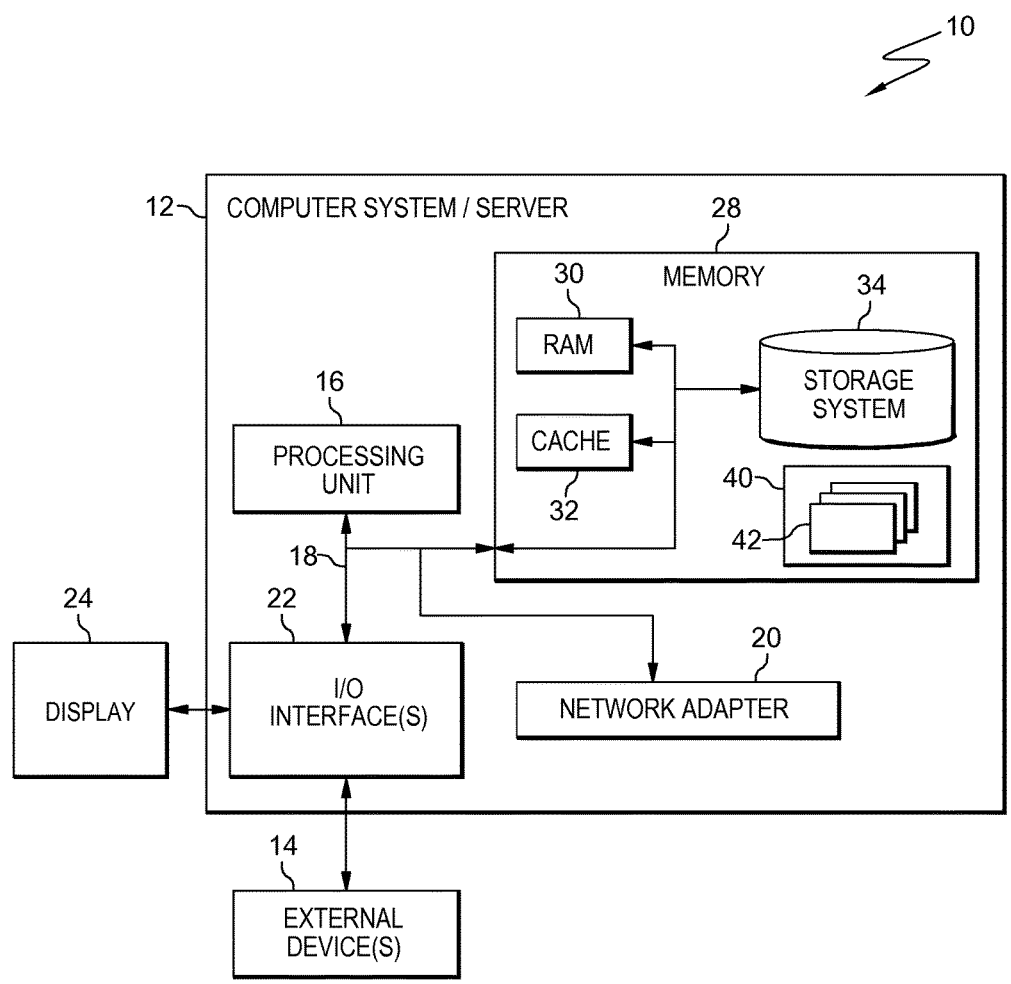
FIG. 10 depicts one example of a cloud computing node, in accordance with one or more aspects.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
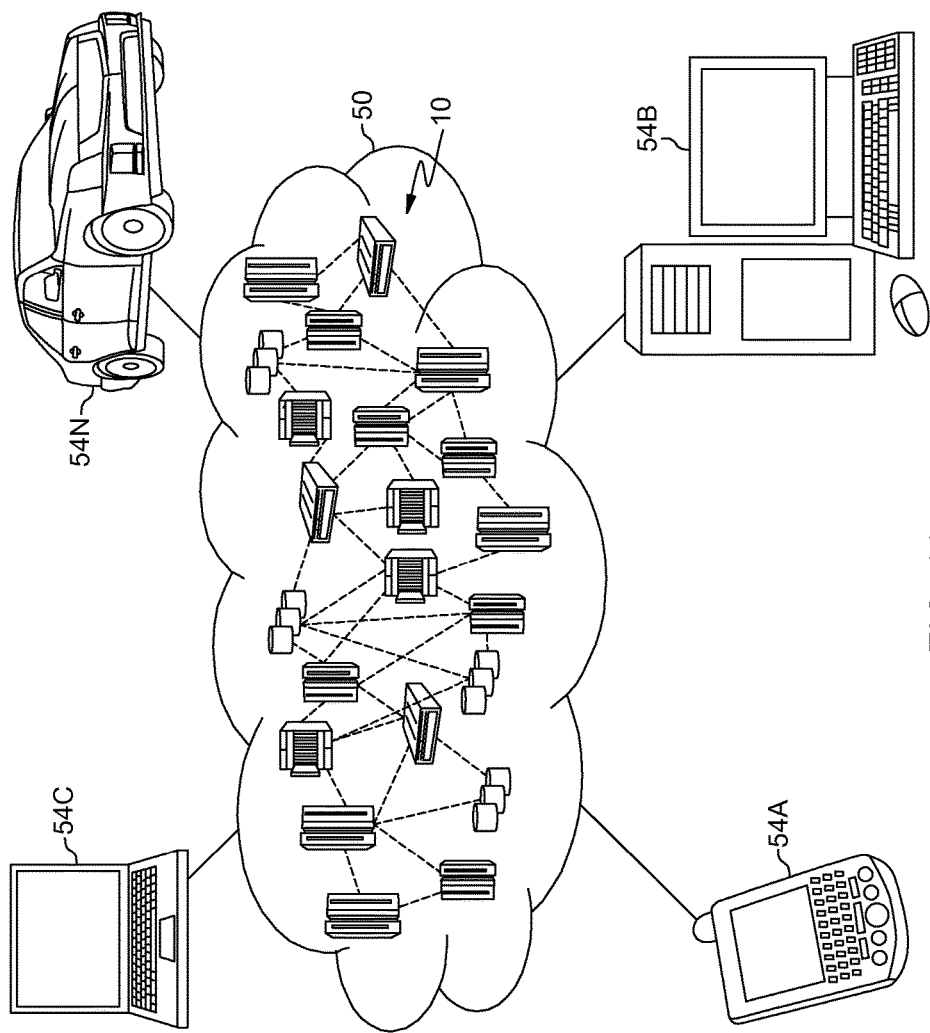
FIG. 11 depicts one embodiment of a cloud computing environment, in accordance with one or more aspects.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
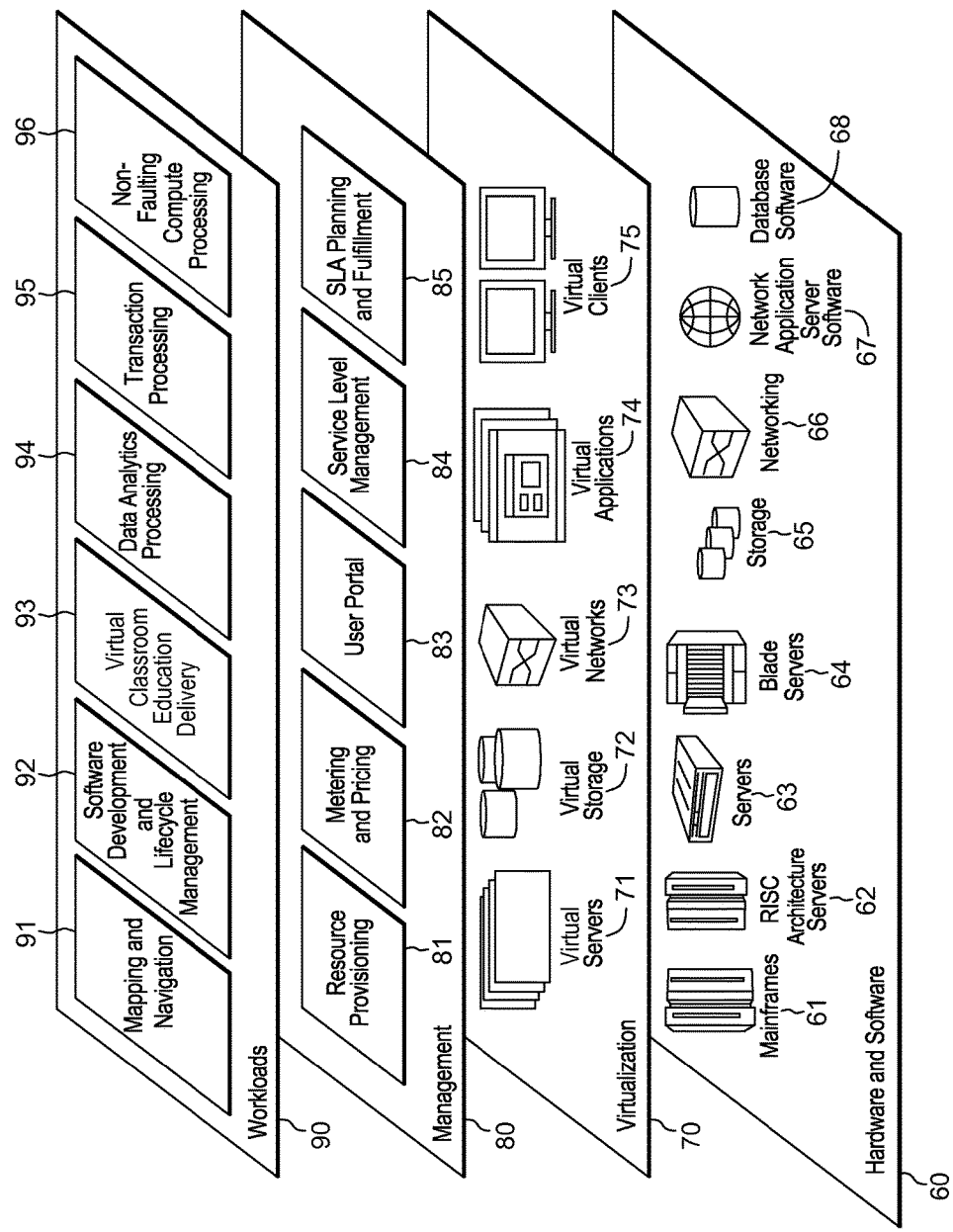
FIG. 12 depicts one example of abstraction model layers, in accordance with one or more aspects.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and non-faulting compute processing of one or more aspects of the present invention 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing of compute instructions in a computing environment, said computer program product comprising:
a computer readable storage medium readable by a processing circuit and storing instructions for execution by the processing circuit for performing a method comprising:
obtaining, by a processor, a compute instruction to be executed, the compute instruction to perform arithmetic or logic computations, and the compute instruction to use a memory operand in a computation indicated by the compute instruction;
determining whether the compute instruction is a non-faulting compute instruction;
obtaining an address associated with the memory operand, the address to be used to locate a portion of memory from which data is to be obtained and placed in the memory operand;
determining whether the portion of memory extends across a specified memory boundary, wherein based on the portion of memory extending across the specified memory boundary, the portion of memory comprises a plurality of memory units;
based on determining the portion of memory extends across the specified memory boundary, checking, based on determining the compute instruction is a non-faulting compute instruction, whether at least one specified memory unit of the plurality of memory units is accessible and whether at least one specified memory unit of the plurality of memory units is inaccessible; and
based on the checking indicating the at least one specified memory unit is accessible and the at least one specified memory unit is inaccessible, accessing the at least one specified memory unit that is accessible and placing data from the at least one specified memory unit that is accessible in one or more locations in the memory operand, and for the at least one unit of memory that is inaccessible, placing default data in one or more other locations of the memory operand, wherein based on placing the data and the default data in the memory operand, the memory operand is to be used in the computation.

2. The computer program product of claim 1, wherein the at least one specified memory unit that is inaccessible is positioned in memory after the at least one memory unit that is accessible.

3. The computer program product of claim 1, wherein the method further comprises emulating the computation, the emulating using the memory operand.

4. The computer program product of claim 1, wherein the method further comprises:
providing control to a control component; and
emulating by the control component the computation, the emulating using the memory operand.

5. The computer program product of claim 1, wherein the method further comprises storing the memory operand in a designated location, the designated location to be accessed to perform the computation.

6. The computer program product of claim 5, wherein the method further comprises:
restarting the compute instruction;
obtaining the memory operand from the designated location; and
performing the computation using the memory operand from the designated location.

7. The computer program product of claim 1, wherein the determining whether the compute instruction comprises a non-faulting compute instruction comprises checking one of: an encoding of the compute instruction, an encoding of the memory operand, an operating mode of the processor, or a prefix of the compute instruction.

8. The computer program product of claim 1, wherein the default data to be placed in the one or more other locations is configurable.

9. The computer program product of claim 1, wherein the checking checks whether a first memory unit is accessible, and the accessing is performed based on at least the first memory unit being accessible.

10. The computer program product of claim 1, wherein based on placing the data and the default data in the memory operand, the compute instruction terminates, and wherein the method further comprises:
restarting the compute instruction, the restarting including performing a context switch from supervisor state to application state based on the placing the data and the default data in the memory operand being performed in supervisor state; and performing the computation indicated by the compute instruction using the memory operand.

11. The computer program product of claim 10, wherein the method further comprises:
   determining whether a partially inaccessible operand facility indicator is set; and
   performing, based on the partially inaccessible operand facility indicator being set, the computation indicated by the compute instruction using the memory operand.

12. The computer program product of claim 10, wherein the restarting further comprises:
   determining whether an instruction being restarted is the compute instruction; and
   performing the computation, based on the instruction being the compute instruction.

13. A computer system for facilitating processing of compute instructions in a computing environment, said computer system comprising:
   a memory; and
   a processor in communications with the memory, wherein the computer system is configured to perform a method, said method comprising:
      obtaining, by the processor, a compute instruction to be executed, the compute instruction to perform arithmetic or logic computations, and the compute instruction to use a memory operand in a computation indicated by the compute instruction;
      determining whether the compute instruction is a non-faulting compute instruction;
      obtaining an address associated with the memory operand, the address to be used to locate a portion of memory from which data is to be obtained and placed in the memory operand;
      determining whether the portion of memory extends across a specified memory boundary, wherein based on the portion of memory extending across the specified memory boundary, the portion of memory comprises a plurality of memory units;
      based on determining the portion of memory extends across the specified memory boundary, checking, based on determining the compute instruction is a non-faulting compute instruction, whether at least one specified memory unit of the plurality of memory units is accessible and whether at least one specified memory unit of the plurality of memory units is inaccessible; and
      based on the checking indicating the at least one specified memory unit is accessible and the at least one specified memory unit is inaccessible, accessing the at least one specified memory unit that is accessible and placing data from the at least one specified memory unit that is accessible in one or more locations in the memory operand, and for the at least one unit of memory that is inaccessible, placing default data in one or more other locations of the memory operand, wherein based on placing the data and the default data in the memory operand, the memory operand is to be used in the computation.

14. The computer system of claim 13, wherein the method further comprises:
   providing control to a control component; and
   emulating by the control component the computation, the emulating using the memory operand.

15. The computer system of claim 13, wherein the method further comprises:
   storing the memory operand in a designated location;
   restarting the compute instruction;
   obtaining the memory operand from the designated location; and
   performing the computation using the memory operand from the designated location.

16. The computer system of claim 13, wherein the default data to be placed in the one or more other locations is configurable.

17. The computer system of claim 13, wherein based on placing the data and the default data in the memory operand, the compute instruction terminates, and wherein the method further comprises:
   restarting the compute instruction, the restarting including performing a context switch from supervisor state to application state based on the placing the data and the default data in the memory operand being performed in supervisor state; and
   performing the computation indicated by the compute instruction using the memory operand.

18. The computer system of claim 17, wherein the method further comprises:
   determining whether a partially inaccessible operand facility indicator is set; and
   performing, based on the partially inaccessible operand facility indicator being set, the computation indicated by the compute instruction using the memory operand.

* * * * *